US010255184B2

(12) United States Patent
Steinmacher-Burow

(10) Patent No.: US 10,255,184 B2
(45) Date of Patent: *Apr. 9, 2019

(54) MEMORY ACCESS ARCHITECTURE WITH COHERENCE

(71) Applicant: International Business Machines Corporation, Armonk, NY (US)

(72) Inventor: Burkhard Steinmacher-Burow, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/345,226

(22) Filed: Nov. 7, 2016

(65) Prior Publication Data

US 2018/0129606 A1    May 10, 2018

(51) Int. Cl.
*G06F 12/00* (2006.01)
*G06F 12/0817* (2016.01)

(52) U.S. Cl.
CPC .. *G06F 12/0824* (2013.01); *G06F 2212/1008* (2013.01); *G06F 2212/62* (2013.01)

(58) Field of Classification Search
CPC ......... G06F 12/0817; G06F 2212/1008; G06F 2212/62
See application file for complete search history.

(56) References Cited

U.S. PATENT DOCUMENTS

| 6,785,773 | B2 | 8/2004 | Farago et al. |
| 6,865,645 | B1* | 3/2005 | Shum ............ G06F 9/3812 |
| | | | 711/123 |
| 7,809,913 | B2 | 10/2010 | Bartley et al. |
| 9,514,050 | B1* | 12/2016 | Agarwal ......... G06F 12/0811 |
| 2005/0216675 | A1* | 9/2005 | Gschwind ....... G06F 12/0824 |
| | | | 711/141 |
| 2008/0086602 | A1* | 4/2008 | Guthrie ......... G06F 12/0817 |
| | | | 711/144 |

(Continued)

OTHER PUBLICATIONS

Wikipedia, "Point-to-point (telecommunications)", From Wikipedia, the free encyclopedia, last edited on Jan. 7, 2018, printed Jan. 30, 2018.

(Continued)

*Primary Examiner* — Prasith Thammavong
(74) *Attorney, Agent, or Firm* — Stosch Sabo

(57) ABSTRACT

Disclosed aspects relate to a computer system having a plurality of processor chips and a plurality of memory buffer chips, and for transferring data in the computer system. One or more of the processor chips is communicatively coupled to at least one memory module which is assigned to the processor chip. One or more of the processor chips includes a cache and is communicatively coupled to one or more of the memory buffer chips via a memory-buffer-chip-specific bidirectional point-to-point communication connection. At least one of the memory buffer chips includes a coherence directory and is configured for being exclusively in charge for implementing directory-based coherence over the caches of the processor chips for at least one pre-defined address-based subset of memory lines stored in at least one of the memory modules assigned to a processor chip.

20 Claims, 13 Drawing Sheets

(56) References Cited

U.S. PATENT DOCUMENTS

| | | | |
|---|---|---|---|
| 2015/0324290 A1* | 11/2015 | Leidel | G06F 12/0817 711/141 |
| 2017/0228316 A1* | 8/2017 | Steinmacher-Burow | G06F 12/0817 |
| 2018/0011792 A1* | 1/2018 | Koker | G06F 12/0804 |
| 2018/0150419 A1* | 5/2018 | Steinmacher-Burow | G06F 13/1673 |

OTHER PUBLICATIONS

Steinmacher-Burow, "Memory Access Architecture With Coherence", U.S. Appl. No. 15/889,356, filed Feb. 6, 2018.

Accelerated Examination Support Document, U.S. Appl. No. 15/889,356, Feb. 5, 2018, 18 pgs.

IBM, List of IBM Patents or Patent Applications Treated as Related, Feb. 5, 2018, 2 pages.

Abts, Dennis, et al; "High Performance Datacenter Networks: Architectures, Algorithms, and Opportunities"; <Synthesis Lectures on Computer Architecture; <http://bnrg.cs.berkeley.edu/~randy/Courses/CS294.S13/2.2.pdf>.

Charlesworth, Alan; "STARFIRE: Extending the SMP Envelope"; IEEE Software; <http://www.cc.gatech.edu/~bader/COURSES/UNM/ece637-Fall2003/papers/Cha98.pdf>.

Carter, Larry.; "CSE 260—Class #2"; <http://cseweb.ucsd.edu/~carter/260/260class02.pdf>.

Tang, Lingjia, et al; "The Impact of Memory Subsystem Resource Sharing on Datacenter Applications"; <http://static.googleusercontent.com/media/research.google.com/en//pubs/archive/37124.pdf>.

Sun Microsystems Federal, Inc.; "Sun Enterprise 10000 System Overview Manual"; <http://docs.oracle.com/cd/E19957-01/805-0310-13/805-0310-13.pdf>.

Intel Corporation; "Intel E7525 Memory Controller Hub (MCH) Chipset Datasheet"; <http://www.intel.com/content/dam/doc/datasheet/e7525-memory-controller-hub-datasheet.pdf>.

Cisco; "Cisco Nexus 9500 Platform Common Equipment Datasheet"; <http://www.cisco.com/c/en/us/products/collateral/switches/nexus-9000-series-switches/datasheet-c78-729404.pdf>.

* cited by examiner

MEMORY ACCESS ARCHITECTURE WITH COHERENCE

BACKGROUND

This disclosure relates generally to computer systems and, more particularly, relates to a computer system comprising a plurality of processor chips and memory modules.

Modern computer systems are typically based on multi-processing architectures comprising two or more processor chips for performing fast processor operations. An important issue for fast data processing may be the retrieval of data and instructions from memory. Retrieving such data and instructions in general may take a significant amount of time relative to the average time required for executing the instructions and processing the data by the processor chips. In high-performance systems cache memory may be used for implementing fast system speeds. Multiple processors accessing the same memory may require ensuring coherence for the data stored in the memory. In order to enable high-speed processor operations, there is a continuous need to improve memory access speed and coherence in multi-processor computer systems.

SUMMARY

Various embodiments provide a computer system with a set of processor chips comprising a plurality of processor chips and a set of memory buffer chips comprising a plurality of memory buffer chips as well as a method for transferring data in the computer system as described by the subject matter of the independent claims.

Aspects of the disclosure relate to a computer system with a set of processor chips comprising a plurality of processor chips. The computer system may include a set of memory buffer chips comprising a plurality of memory buffer chips. The processor chips may be communicatively coupled to at least one memory module which is configured for storing memory lines and which is assigned to the processor chip. The processor chips can include a cache which is configured for caching memory lines. The processor chips may be communicatively coupled to each of the memory buffer chips via a memory-buffer-chip-specific bidirectional point-to-point communication connection. At least one of the memory buffer chips includes a coherence directory and is configured for being exclusively in charge for implementing directory-based coherence over the caches of the processor chips for at least one pre-defined address-based subset of memory lines stored in at least one of the memory modules assigned to one of the processor chips. The processor chip assigned to the at least one memory module may be configured for transferring memory lines of the subset of memory lines between the at least one memory module and the caches of each of the remaining processor chips of the set of processor chips using the memory buffer chip in charge for implementing the coherence for the subset of memory lines as a transfer node. The assigned memory buffer chip may be configured for updating its coherence directory regarding the transfer of the memory lines.

Aspects of the disclosure relate to a method for transferring data in a computer system with a set of processor chips comprising a plurality of processor chips. The computer system can include a set of memory buffer chips comprising a plurality of memory buffer chips. The processor chips may be communicatively coupled to at least one memory module which is configured for storing memory lines and which is assigned to the processor chip. The processor chips may include a cache configured for caching memory lines. The processor chips can be communicatively coupled to each of the memory buffer chips via a memory-buffer-chip-specific bidirectional point-to-point communication connection. At least one of the memory buffer chips can include a coherence directory and be configured for being exclusively in charge for implementing directory-based coherence over the caches of the processor chips for at least one pre-defined address-based subset of memory lines stored in at least one of the memory modules assigned to one of the processor chips. Aspects may include transferring by the processor chip assigned to the at least one memory module a memory line of the subset of memory lines between the at least one memory module and the cache of one of the remaining processor chips of the set of processor chips using the memory buffer chip in charge for implementing the coherence for the subset of memory lines as a transfer node and updating by the memory buffer chip the coherence directory regarding the transfer of the memory lines.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
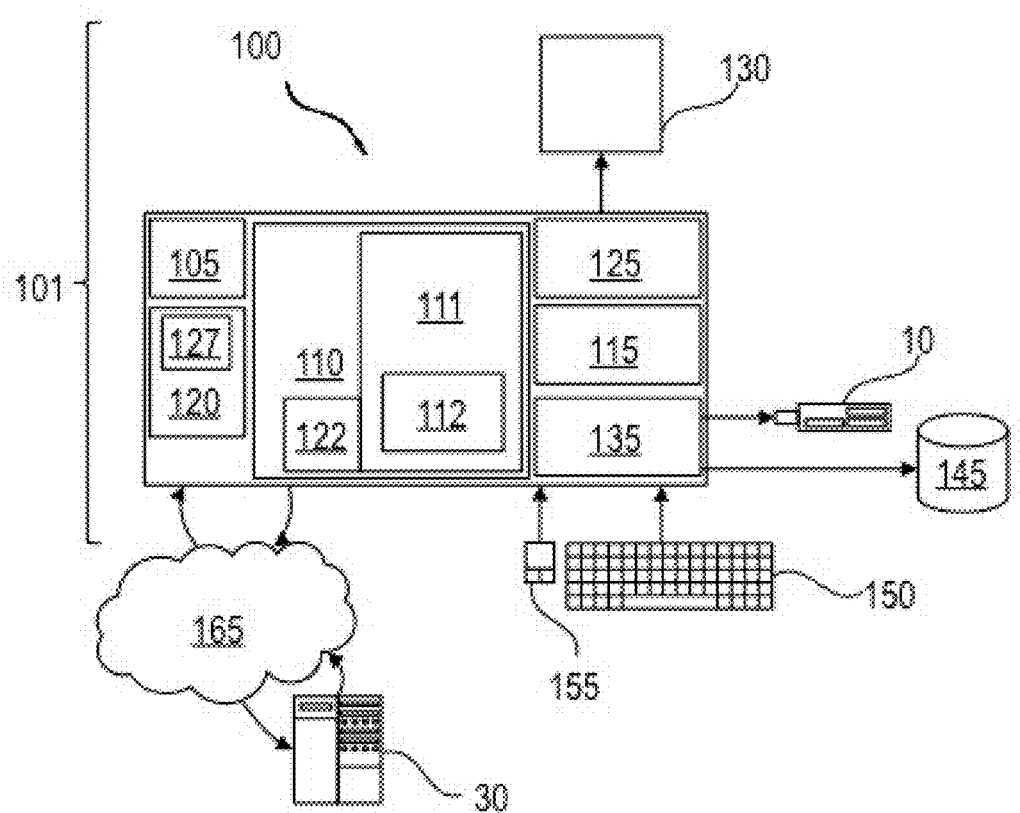
FIG. 1 depicts an exemplary system suited for implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The description of the various embodiments of the present disclosure are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may have the beneficial effect that the memory buffer chips provide an efficient non-uniform memory access (NUMA) for each of the processor chips to the memory modules local to the processor chips. Each processor chip is provided with a low latency access to the memory modules local to the other processor chips, i.e. communicatively connected and assigned to the respective processor chip to which they are local, via one of the memory buffer chips. The connections between the processor chips and the memory buffer chips may be provided by bidirectional serial point-to-point communication connections. Thus, a e.g. a requested memory line may be received by the processor chip requesting the memory line via one of the memory buffer chips responsible for implementing coherence of the requested memory line and a processor chip storing the requested memory line in one or more of its local memory modules.

A processor may comprise two or more independent actual processing units, i.e. cores, which are the units that read and execute program instructions. The multiple cores may run multiple instructions at the same time, increasing overall speed for programs amenable to parallel computing. The cores may for example be integrated onto a single integrated circuit die or onto multiple dies in a single chip package. A memory buffer chip may refer to an electronic circuit on a chip which manages the access to one or more memory modules and may establish coherence for the data stored in the memory modules.

The memory modules communicatively coupled and assigned to a memory buffer chip may be local to the memory buffer chip, i.e. they may only be accessed via the respective memory buffer chip. The memory modules may further be local to the memory buffer chip.

Embodiments may further have the beneficial effect that each processor chip has a low latency access to the memory line stored in the memory modules local to the respective processor chip. The access to the local memory modules may be provided with an even lower latency compared to the latency required for accessing memory modules of other processor chips. In particular, such an access to a local memory module is performed is not performed via one of the memory buffer chips, but rather directly and thus faster. Thus data with a high priority, e.g. frequently used data, may be stored in the memory modules local to a processor chip.

Embodiments may further have the beneficial effect that coherence of the memory lines stored in the memory modules local to processor chips is efficiently implemented based on coherence directories provided by the memory buffer chips. Each memory buffer chip may be assigned with the task to implement coherence for at least one subset of memory lines. Each memory line may be stored within one or more memory modules local to the same processor chip. Thus, a memory buffer chip may be assigned within the task to implement coherence for one or more subsets of memory lines of different processor chips. The memory lines of the same subset may be stored in memory modules local to the same processor chip.

According to embodiments, the computer system may in addition to the set processor chips comprise further processor chips. The further processor chips may not have any local memory modules, i.e., may not be communicatively coupled to any memory modules assigned to the further processor chips. Each of the further processor chips may communicatively be coupled to each of the memory buffer chips of the set of memory buffer chips via a memory-buffer-chip-specific bidirectional point-to-point communication connection.

According to embodiments, each of the processor chips being communicatively coupled to a plurality of the memory modules. Embodiments may have the beneficial effect that a sufficiently large memory capacity may be provided for storing even large memory objects like memory pages.

According to embodiments, the system comprising a plurality of address-based subsets of memory lines, memory lines of the same subset being stored in memory modules assigned to the same processor chip, for each of the subsets directory-based coherence being implemented by each of the memory buffer chips comprising a coherence directory and being configured for being exclusively in charge for implementing the directory-based coherence over the caches of the processor chips for at least one subset of the plurality of subsets of memory lines. Embodiments may have the beneficial effect that directory-based coherence may be implemented for a large number of memory modules attached to a large number of processor chips, using a coherence directory distributed across the memory buffer chips. Thus the local storage capacity for locally storing the coherence directories on the memory buffer chips may be kept low.

According to embodiments, the memory modules assigned to the processor chips being locally attached to the assigned processor chip in form of an integrated on-package memory. Embodiments may have the further beneficial effect that by using an integrated on-package memory, latency as well as energy consumption may be reduced.

Embodiments may further have the beneficial effect that efficient and space-saving setups for providing large memory capacities may be provided. Memory modules may for example be implemented in form of a stacked in DRAM memory located on the processor chip. This may for example be implemented using hybrid memory cube (HMC) which is a high-performance RAM interface for through-silicon via (TSV)-based stacked in DRAM memory. HMC combines through-silicon via and micro bumps to connect multiple, e.g. 4-8, dies of memory modules, e.g. memory cell arrays, on top of each other. The memory controller may be integrated in a separate die. HMC may have the beneficial effect of using standard DRAM cells providing more data banks than classic DRAM memory of the same size. Stacked RAM modules may contain two or more RAM chips stacked on top of each other allowing for large modules to be manufactured using cheaper low-density wafers.

According to further embodiments on-package memory may be implemented using high bandwidth memory (HBM). HBM provides a high-performance RAM interface for stacked DRAM. A higher bandwidth may be achieved while using less power in a small form factor. This is achieved by stacking up two 8 DRAM dies, including an optional base die with a memory controller, which are communicatively coupled by through-silicon via (TSV) and micro bumps. The HBM technology is a similar principle but incompatible with the hybrid memory cube interface.

According to embodiments, at least one of the processor chips is communicatively coupled to the at least one memory module assigned to the processor chip via an accelerator chip (ACC). Embodiments may have the beneficial effect of enabling a faster access to the memory modules and to outsource the logic and processing load for accessing the memory modules. An accelerator chip may for example be provided in form of a graphics processing unit (GPU), i.e. a specialized circuit designed to rapidly manipulate and alter memory. Alternatively, a field-programmable gate array (FPGA) or an application-specific integrated circuit (ASIC) may for example be used in order to implement an acceleration chip. An acceleration chip may be arranged between the processor chip and the local memory modules. According to embodiments each processor chip may be provided with two or more accelerator chips. Each accelerator chip may be operatively coupled with one or more memory modules. For a memory page, the memory lines may use the memory modules attached to or within a single accelerator chip. According to embodiments, each of the processor chips may be communicatively coupled to all the memory modules assigned to the respective processor chip via an accelerator chip.

According to embodiments, the bidirectional point-to-point communication connections are serial communication connections. Using thin communication connections in form of serial communication connects may allow processor chips to have a point-to-point (p2p) connection to a large number of memory buffer chips, e.g. 100 or more. Today's high-speed signaling allows such a thin connection, since high-enough speed adds low-enough serialization delay for transfer of a memory line over a thin connection.

Thus, using serial communication connections which are thin may allow to implement fewer pins for data transfer between processor chips and memory buffer chips relative to generally used non-uniform memory access architectures and to support greater memory capacities and greater memory bandwidth. Increasing pin bandwidth may allow for using many serial point-to-point communication connections, while still ensuring high-speed data transfer of a single memory line. By using serial communication connections each established between a port of a processor chip and a port of a memory buffer chip, the number of memory buffer chips communicatively coupled to each processor chip may be increased resulting in a paradigm shift to many-ported processor chips and memory buffer chips. The increase of serial bandwidth relative to memory line size allows memory interconnect built from serial point-to-point communication connections. The transfer of a memory line from a memory buffer chip to a processor chip has first to be completed before the processor chip execution can use that memory line. However, considering for example an up-to-date transfer rate of 25 Gbit/s, the serialization latency for a 64 B (512b) memory line may be reduced to approximately 20 ns. Thus, allowing for implementing efficient serial communication providing high speed transfer.

According to embodiments, each of the bidirectional serial point-to-point communication connections comprises a single differential signaling pair of conductors for each direction of communication. Embodiments may have the beneficial effect that serial point-to-point communication connections implementing differential signaling may be provided. By implementing differential signaling data may be transmitted between a processor chip and a memory buffer chip using two complimentary signals. The same electrical signal is sent as a differential pair of signals, each signal being sent in its own conductor. The pair of conductors used for differential signaling may for example be wires or tracers. The communication may be a bidirectional communication sending data from the processor chip to the memory buffer chip and vice versa. Therefore, the serial point-to-point communication connection may comprise two pairs of conductors. Provided that the source and the receiver impedances are equal, external electromagnetic interference tends to affect both conductors of the pair of conductors identically. Since the receiver only detects the difference between the two signals sent via the two conductors, electromagnetic noise may be reduced.

According to embodiments, each of the bidirectional serial point-to-point communication connections comprises a single single-ended signaling conductor for each direction of communication. Embodiments may have the beneficial effect that they allow to implement single-ended signaling. Single-ended signaling may use one conductor with a reference, i.e. ground conductor. For example, all processor chips and memory chips may share a common ground. Bidirectional communication may be implemented by providing a single conductor for each direction of communication. A minimum of two conductors may be used for implementing a serial point-to-point communication connection. Thus, using single-ended signaling may have the advantage of using fewer conductors.

According to embodiments, the processor chip assigned to the at least one memory module further being configured for transferring the memory lines of the subset of memory lines directly between the at least one memory module and the cache of the assigned processor chip without using any of the memory buffer chips as a transfer node. Embodiments may have the beneficial effect that memory lines stored in a memory module local to a processor chip may be accessed faster by the respective processor chip without any avoidable communication loops via one of the memory buffer chips.

According to embodiments, each of the memory lines stored in the at least one of the memory modules assigned to one of the processor chips comprising a line state bit (LSB) which indicates, whether the memory line is cached by any other processor chip than the assigned processor chip. The system is configured such that, if the line state bit indicates that the memory line is not cached by any other processor chip than the assigned processor chip, the assigned processor chip transfers the memory line between the at least one memory module and the cache of the assigned processor chip without examining or updating the coherence directory of the memory buffer chip which implements the coherence for the memory line. Embodiments may have the beneficial effect that they allow for an efficient handling of the memory lines. The line state bit may indicate that no copies of a requested memory line are cached by any other processor chip. Thus, it is not necessary to access the coherence directory for the respective memory line on one of the memory buffer chips for further details, e.g. regarding which processor chip is caching which type of copy of the memory line.

For example, if an exclusive write copy of the requested memory line is cached by any of the processor chips, the respective copy of the memory line is requested from the respective processor chip by interposing the buffer chip implementing coherence of the memory line. Furthermore, embodiments may allow avoiding to first looking up the coherence directory of the memory buffer chip implementing coherency for the memory line, only to be provided with information that no copies of the respective memory lines are cached by any other processor chip. Such an enquiry may result in an unnecessary data exchange loop between the processor chip and the coherence implementing memory buffer chip. This additional loop may be avoided by using the line state bit.

According to embodiments, each memory line comprises two line state bits configured for indicating whether a shared read version, an exclusive write version or no version of the memory line being cached by any other processor chip than the assigned processor chip. Embodiments may have the beneficial effect that two line state bits may be allowed to distinguish between more states. For example, a first state indicating that a shared read copy of the memory line is cached in another processor, allowing for shared read by the local processor. This first state may for example be indicated by '01'. A second state may indicate that an exclusive write copy of the memory line is cached in another processor. Before read or write of the respective memory line, the local chip processor must retrieve the memory line via the appropriate memory buffer chip. The second state may for example be indicated by '10'. Finally, a third state may indicate that no copies of the memory line are cached by any other processor allowing the local processor chip to read from or write to the respective memory line. This third state may for example be indicated by '00'.

According to embodiments, the system is configured such that, if the two line state bits indicate that an exclusive write version of the memory line is cached by a processor chip other than the assigned processor chip, the assigned processor chip transfers the memory line from the cache of the processor chip caching the memory line to the cache of the assigned processor chip using the memory buffer chip in charge for implementing the coherence for the memory line as a transfer node. The coherence directory of the memory buffer chip is examined by the memory buffer chip to identify the processor chip other than the assigned processor chip and updated regarding the transfer of the exclusive write version of the memory line. Embodiments may have the beneficial effect that they may ensure that always the most current version of the memory line is processed by the processor chips.

According to embodiments, each memory line which is cached by any of the processor chips is further provided with a dirty bit indicating if the memory line has been modified without having stored the modification by updating the memory line in the memory module. Embodiments may have the beneficial effect that application performance may be improved by avoiding writes to storage. The dirty bit may indicate that an associated memory line has been modified and has not yet been saved to its original memory module. Dirty bits added to each memory line identify if the memory line data value or LSB value has not yet been stored to memory. Eventually when the memory line is flushed or invalidated from the cache of a processor chip, the dirty bit may be used to identify the cached line data value or LSB value should be stored to its original memory module.

According to embodiments, each memory buffer chip comprises a cache for caching the memory lines comprised by the pre-defined subset of memory lines for which the memory buffer chip exclusively implements coherence. Embodiments may have the advantage that it may be fast and more energy efficient to read or write access the memory line in a local cache of the memory buffer chip, than from or to a memory module local to the memory buffer chip.

According to embodiments, at least one of the memory buffer chips is a cache buffer chip without memory modules communicatively coupled and assigned to the cache buffer chip. Embodiments may have the beneficial effect that for some applications the computer system may be preferred with all memory modules or other memory storage being local to the processor chips, i.e., being communicatively coupled and assigned to the processor chips.

According to embodiments, each of the memory buffer chips is communicatively coupled to at least one memory module which is configured for storing memory lines and which is assigned to the memory buffer chip. Each of the memory buffer chips is further configured for implementing the directory-based coherence for the memory lines stored in the at least one memory module assigned to the memory buffer chip. According to embodiments, each of the memory buffer chips is communicatively coupled to a plurality of memory modules which are configured for storing memory lines and which are assigned to the respective memory buffer chip. Each of the memory buffer chips is further configured for implementing the directory-based coherence for the memory lines stored in all the memory modules assigned to the memory buffer chip. Embodiments may have the beneficial effect that the memory buffer chips may provide a large memory capacity provided by the memory modules local to the memory buffer chips. Furthermore, each memory buffer chip may provide directory-based coherence for each of the memory modules local to the respective memory buffer chip. Each memory process may be provided with the same uniform memory access to all of the memory modules attached to the memory buffer chips, while each buffer chip may offer the same uniform memory access to all of the processor chips. Thus, each processor chip may be provided with access to any memory line stored in any memory module local to any memory buffer chip with the same latency and bandwidth.

According to embodiments, each memory buffer chip comprises a cache for caching one or more of the memory lines stored in the at least one memory module assigned to the memory buffer chip. Embodiments may have the advantage that it may be faster and more energy efficient for the memory buffer chip to read or write access the memory line in its local cache, than for the memory buffer chip to access the memory line from the processor chip with the local memory module comprising the respective memory line.

According to embodiments, the memory modules assigned to the memory buffer chip which implements the directory-based coherence for at least one of the subsets of memory lines is configured for caching one or more memory lines of the at least one subset. The coherence directory of the memory buffer chip indicates for each of the memory lines of the subset if the memory line is cached in the memory modules assigned to the memory buffer chip. Embodiments may have the beneficial effect to allow minimization of remote-access to memory modules local to processor chips. Memory buffer chips may instead cache memory line values in their local memory modules. In some embodiments, the aggregate capacity of memory modules local to memory buffer chips may be far larger than that of memory modules local to processor chips. Therefore, an area in one or more memory modules attached to a memory buffer chip may be dedicated for a copy of the entire memory module local to a processor chip. So no directory is needed to find the copy of a memory line cached in the memory module attached to a memory buffer chip. Memory lines would be mapped across memory buffer chips as for the coherence directory. Each address in memory modules local to processor chips may have a copy at a fixed address in a memory module local to a memory buffer chip. Assuming this caching is only done for a memory line in the coherence directory, then each directory entry may include information indicating whether the memory module local to a memory buffer chip has a valid copy of the memory line stored in a memory module local to a processor chip. Embodiments may further have the beneficial effect that no additional cache is required on the memory buffer chip.

According to embodiments, each processor chip comprises a number of P ports. Each memory buffer chip comprises a number of H=P/X ports. P, H, and X are positive integers. Each port is configured for establishing a single one of the bidirectional point-to-point communication connections. The set of processor chips comprises H/Y processor chips. The set of memory buffer chips comprises P/Y memory buffer chips, where Y is a positive integer selected from the interval of 1 to X to construct a pre-selected size of computer system. Each processor chip is communicatively coupled to each memory buffer chip by Y bidirectional point-to-point communication connections. Each bidirectional point-to-point communication connection is established via a pair of ports which comprises one of the P ports of the processor chip and one of the H ports of the memory buffer chip. Each pair of ports is exclusively assigned to the respective bidirectional point-to-point communication connection.

According to embodiments, for transferring any given one of the memory lines via the memory buffer chip which implements the directory-based coherence for the respective memory line each processor chip uses a pre-defined one of its P ports which is communicatively coupled via one of the bidirectional point-to-point communication connections to a pre-defined one of the H ports of the memory buffer chip which implements the directory-based coherence for the respective memory line. The pre-defined ports are assigned to the address of the memory line. The coherence directory of the respective memory buffer chip treats each one of the H ports of the memory buffer chip as an independent participant taking part in the transfer of the memory line. Thus, when indicating active participants by which the memory line is cached, the coherence directory indicates for the memory line at most WY active participants.

Embodiments may have the beneficial effect that the system may easily be adjusted in size, by removing individual memory buffer chips or processor chips, based on the requirements regarding memory capacity and processing capacity to be provided.

The method for transferring data in a computer system according to the present disclosure may be suitable for operating each of the embodiments described herein.

FIG. 1 shows an exemplary general system 100 suited for implementing embodiments of the present disclosure. It will be appreciated that the general system 100 described herein may be any type of computerized system comprising a plurality of plurality of processor chips, a plurality of memory buffer chips and a memory. The general system 100 may for example be implemented in form of a server, an embedded computerized system or general-purpose digital computer, such as a personal computer, workstation, minicomputer, or mainframe computer. The most general system 100 therefore includes a general-purpose computer 101.

The computer 101 may in particular be configured as a server, i.e. being optimized for a high speed data exchange with a large number of clients. The computer 101 may further provide a large processing capacity, i.e. CPU capacity, and/or large memory capacity. Furthermore, the software in memory 110 may comprise a server software application for processing a large number of requests by clients.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). Note that the memory 110 can have a distributed architecture, where additional modules are situated remote from one another, but can be accessed by the processor 105.

The software in memory 110 may include one or more separate programs, each of which comprises an ordered listing of executable instructions for implementing logical functions, notably functions involved in embodiments of this disclosure. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured for executing software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage.

Figure 2:
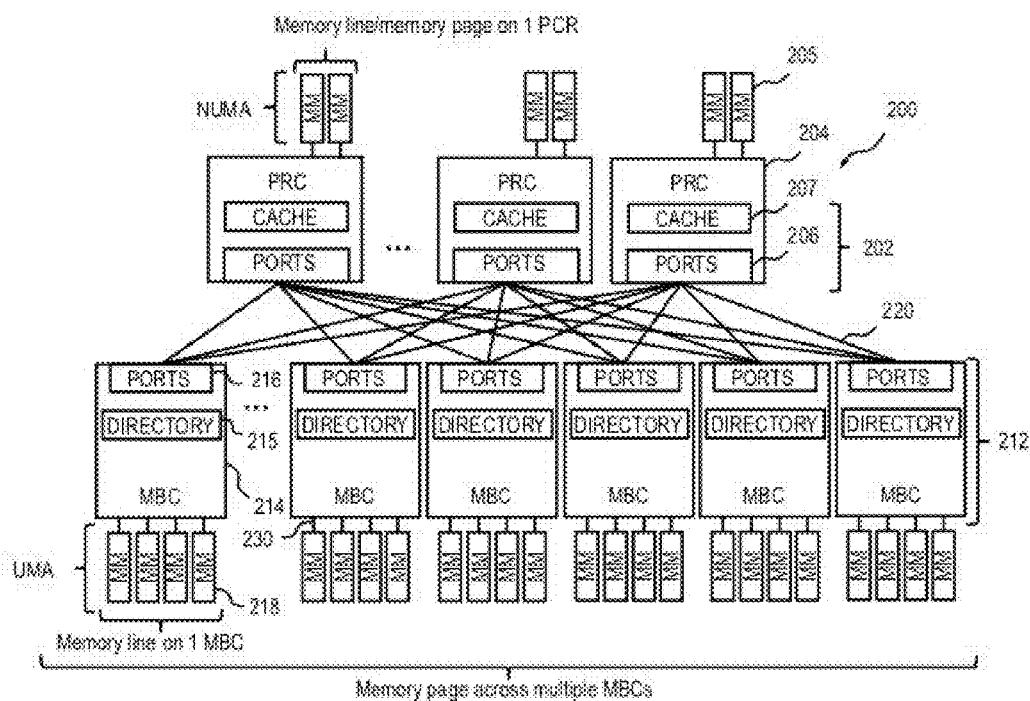
FIG. 2 depicts a schematic diagram illustrating a first example.

FIG. 2 shows a first exemplary embodiment of a computer system 200. The computer system 200 comprises a set of processor chips 202 comprising a plurality of processor chips 204. Furthermore, the computer system comprises a set of memory buffer chips 212 which comprises a plurality of memory buffer chips 214. Each processor chip 204 may be provided with zero, one or more local memory modules 205. In the example of FIG. 2, each processor chip 204 e.g. is provided with two local memory modules 205. The memory modules 205 may for example be provided in the form of dual in-line memory modules (DIMM) comprising a series of dynamic random-access memory integrated circuits. The memory modules 205 may for example be provided in the form of phase change memory (PCM) or other memory storage technology. Each processor chip 204 may be provided with a plurality of ports 206. According to an embodiment the number of ports 216 provided per processor chip 204 equals the number of memory buffer chips 214. Each processor chip 204 may further be provided with a cache 207 for caching memory line to be processed by the processor chip 204. For the set of processor chips 202 in the system 200, each processor chip 204 may have the same or different number and form of local memory modules 205. For the set of processor chips 202 in the system 200, the processor chips 204 may or may not be identical. For example, one or more of the processor chips 204 may have no processor cores and be an optimized chip for accessing the local memory modules 205. Application software may execute on one or more processor chips 204 and thus a given application may implicitly or explicitly exploit and benefit from similar or different processor chips 204.

Each memory buffer chip 214 may be provided with a plurality of local memory modules, e.g. DRAM DIMM. Further, each memory buffer chip 214 may comprise a plurality of ports 216. For example, the number of ports 216 per memory buffer chip 214 may be equal to the number of processor chips 204. In addition, each memory buffer chip 214 may comprise a coherence directory 215 for implementing directory-based coherence for at least one predefined address-based subset of memory lines stored in one or more of the memory modules 205 local to one of the processor chips 204. Furthermore, the coherence directory 215 may implement directory-based coherence for memory lines stored in the memory modules 218 local to the respective memory buffer chip 214. For the set of memory buffer chips 212 in the system 200, all the memory buffer chips 214 may be same or similar with each memory buffer chip 214 performing similar functions. For the set of memory buffer chips 212 in the system 200, all the memory buffer chips 214 may comprise a distributed coherence directory 215 for implementing directory-based coherence for a predefined address-based set of memory lines stored in the memory modules 205 local to one of the processor chips 204, where each memory buffer chip 214 is in charge for its own unique address-based subset of memory lines. Application software may execute on one or more processor chips 204 and thus performance of a given application typically benefits from memory being served by many and similar memory buffer chips 214, with each particular memory address being served by a single predefined memory buffer chip 214.

Each processor chip 204 may be communicatively coupled with each memory buffer chip 214 via a bidirectional point-to-point communication connection 220, e.g. a serial communication connection. Thus, each processor chip 204 may be provided with memory access to each of the memory modules 218 local to memory buffer chips 214 as well as to each memory module 205 local to each processor chip 204. The access to the memory modules 218 is provided based on a uniform memory access (UMA) architecture, while the access to the memory modules 205 is provided based on a non-uniform memory access (NUMA) architecture.

The computer system may for example comprise 16 processor chips 204 and 128 memory buffer chips 214. In this case, each processor chip 204 may comprise 128 ports 206 in order to be communicatively coupled to each of the memory buffer chips 214. Furthermore, each of the memory buffer chips 214 may be provided with 16 ports 216 such that each memory buffer chip 214 may be communicatively coupled to each processor chip 204 via a distinct point-to-point communication connection 220.

Figure 3:
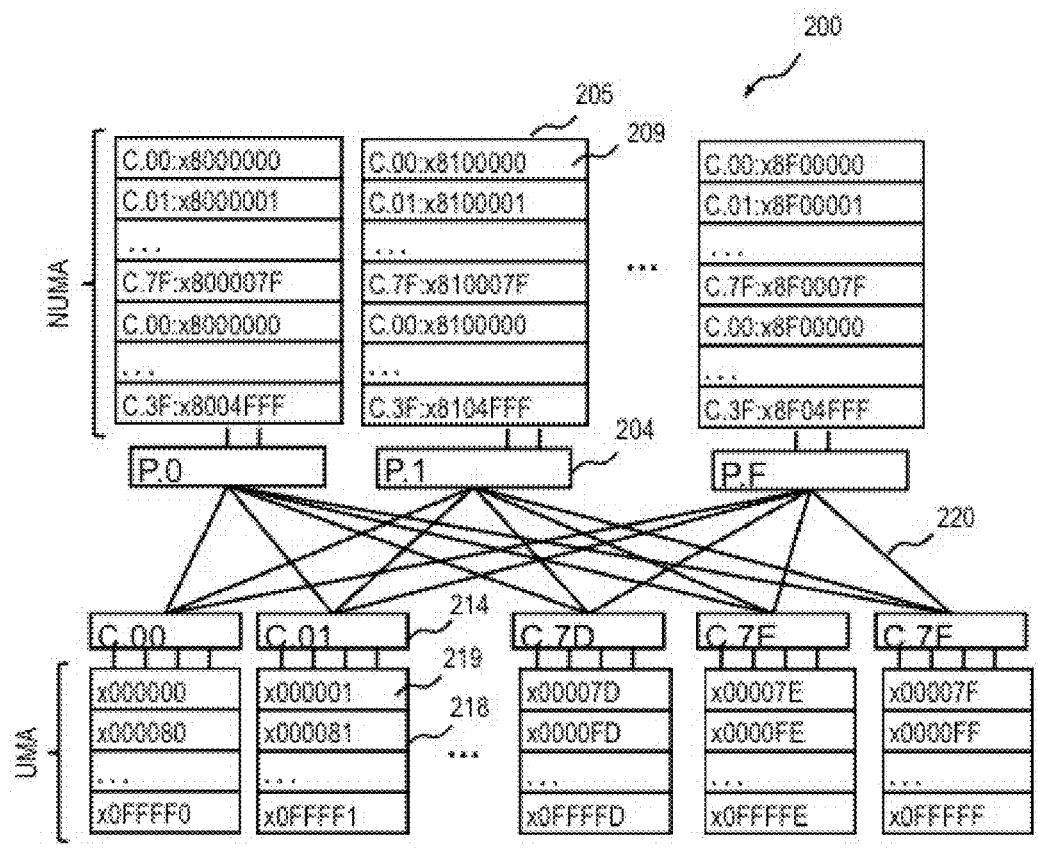
FIG. 3 depicts a schematic diagram illustrating the address structure of the first example of FIG. 2.

FIG. 3 depicts an exemplary address architecture for the example of FIG. 2. FIG. 3 shows for each memory line, of the memory modules 205 and 218 local to the processor chips 204 and the memory buffer chips 214, its unique address 209, 219 respectively. FIG. 3 provides a simplified schematic diagram, neglecting address portions identifying bytes within the memory lines as well as neglecting typical scrambling of physical addresses to reduce the chances of performance hotspots. For example, a first set of 128 lines (x0000 to x007F) may alternatively be permuted across 128 memory buffer chips 214. Similarly, each other set of 128 memory lines of the memory modules 218 attached to the memory buffer chips 214 may be permuted. Further, the memory buffer chips 214 implementing coherence for the memory modules 205 local to the processor chips 204 may be permuted.

For the purposes of illustration, it is assumed in FIG. 3 that the computer system comprises 16 processor chips identified as P.0 to P.F and 128 memory buffer chips identified as C.00 to C.7F. For the memory lines of the memory modules 218 local to memory buffer chips 214 the unique physical addresses 219 are shown. For the memory lines of the memory modules 205 local to the processor chips 204 the identifier of the memory buffer chip 214 providing coherence for the respective memory line as well as the physical address 209 of the respective memory line are shown according to the following format: 'identifier of memory buffer chip providing coherence: address of memory line'. Furthermore, the identifier of the memory buffer chips 214 as well as the processor chips 204 are shown in FIG. 3.

Figure 4:
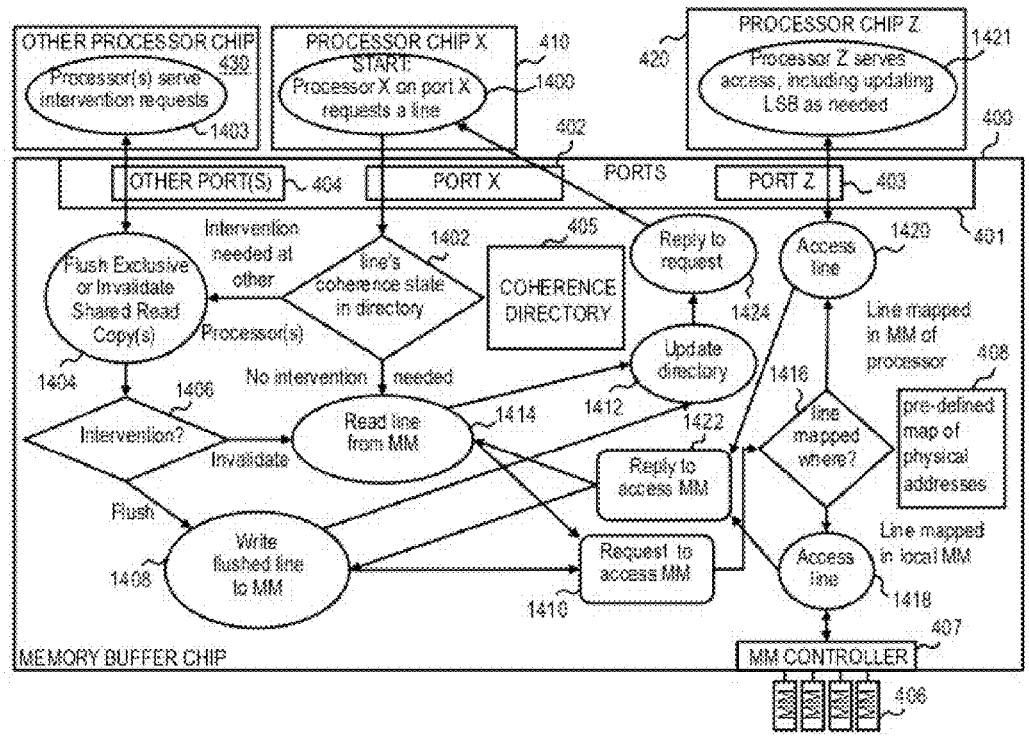
FIG. 4 depicts a schematic flow diagram of a first exemplary method for operating the first example of FIG. 2.

FIG. 4 shows a flow diagram of a method performed by a memory buffer chip 400 in order to provide a processor chip X 410 with a requested memory line. The requested memory line may be stored in a memory module local to a processor chip Z 420. Furthermore, a copy of the requested memory line may be cached by one or more other processor chips 430, when the memory line is requested.

The memory buffer chip may comprise a plurality of ports 401. Port X 402 may establish a bidirectional point-to-point connection to the processor chip X 410. Port Z 403 may establish a bidirectional point-to-point communication connection to processor chip Z 420. Furthermore, the ports 401 may comprise one or more other ports 404 establishing connections to one or more other processor chips 430. For example, 16 ports may be provided in total. The memory buffer chip may further comprise a coherence directory 405 for implementing coherence for memory lines stored in memory modules local to the processor chip Z 420 as well as memory lines stored in memory modules 406 local to the memory buffer chip 400. The access to the memory modules 406 may be controlled by a DRAM controller 407. In block 1400, the processor chip X 410 may request a memory line on port X 402 of the memory buffer chip 400. In block 1402, the memory line's coherence state as stored in the coherence directory is examined. In case an intervention is needed at another processor chip 430, e.g. because the processor chip X 410 has requested an exclusive write copy of the memory line, while another processor chip 430 caches a copy of the requested memory line, or because another processor chip 430 currently caches an exclusive write copy, the method continues with block 1404. In block 1404, any exclusive write copy cached by another processor chip 430 is triggered to be flushed and/or any shared read copies cached by any other processor chips 430 are triggered to be invalidated (cf. block 1403). In block 1406, it is determined which kind of intervention was required.

In case a modified exclusive write copy of the requested memory line is flushed, the method continues in block 1408, where the flushed line is written to its memory module local to processor chip Z 420 by providing a respective request in block 1410 to access the memory module local to the processor chip Z 420. Furthermore, in block 1412 the coherence directory is updated indicating that the exclusive write copy has been flushed. In case it is determined in block 1406 that one or more shared read copies are to be invalidated, the method continues in block 1414 with reading the requested memory line from the memory modules local to the processor chip Z 420 by providing a respective request to access the respective memory modules in block 1410. In case the memory line's coherence state in the coherence directory indicates that no intervention is needed, i.e. no copies of the requested memory line are cached by any other processor chips 430, the method continues with block 1414.

In block 1410 a request to access the requested memory line in the memory module, where it is stored is generated: In block 1416, it is determined where the requested memory line is mapped using a predefined map of physical addresses 408. The map 408 may e.g. be implemented in form of an algorithm dynamically evaluating the address to determine the storage location of the requested memory line. In case the memory line is mapped in the memory modules 406 local to the memory buffer chip 400, the memory line is accessed in block 1418 in the memory module 406 via the DRAM controller 407. In block 1422, a reply to the access request may be generated. In case it is determined in block 1416 that the memory line is mapped in a memory module local to the processor chip Z 420, the requested memory line is accessed in block 1420 via port Z 403 in the memory module local to the processor chip Z 420. Processor chip Z 420 may serve the access and update the line state bit as needed in block 1421. In block 1422, a copy of the access memory line is provided as a reply to the access. The method may continue in block 1412 by updating the coherence directory and providing the requested copy of the memory line as a reply to the request in block 1424 to the processor chip X 410 via port X 402.

In case the processor chip X 410 is identical with the processor chip Z 420, in other words the processor chip X requests a memory line stored in a memory module local to processor chip X 410, then a scenario flushing an exclusive write copy of the requested memory line by another processor chip 430 comprising writing the requested memory line to a memory module local to the processor chip Z 420 and replying the memory line to the processor chip X may be redundant. In order to optimize the implementation these redundant operations may be avoided. In other words, the exclusive write copy of the requested memory line may be directly provided to the processor chip X 410 including updating the coherence directory 405.

Figure 5:
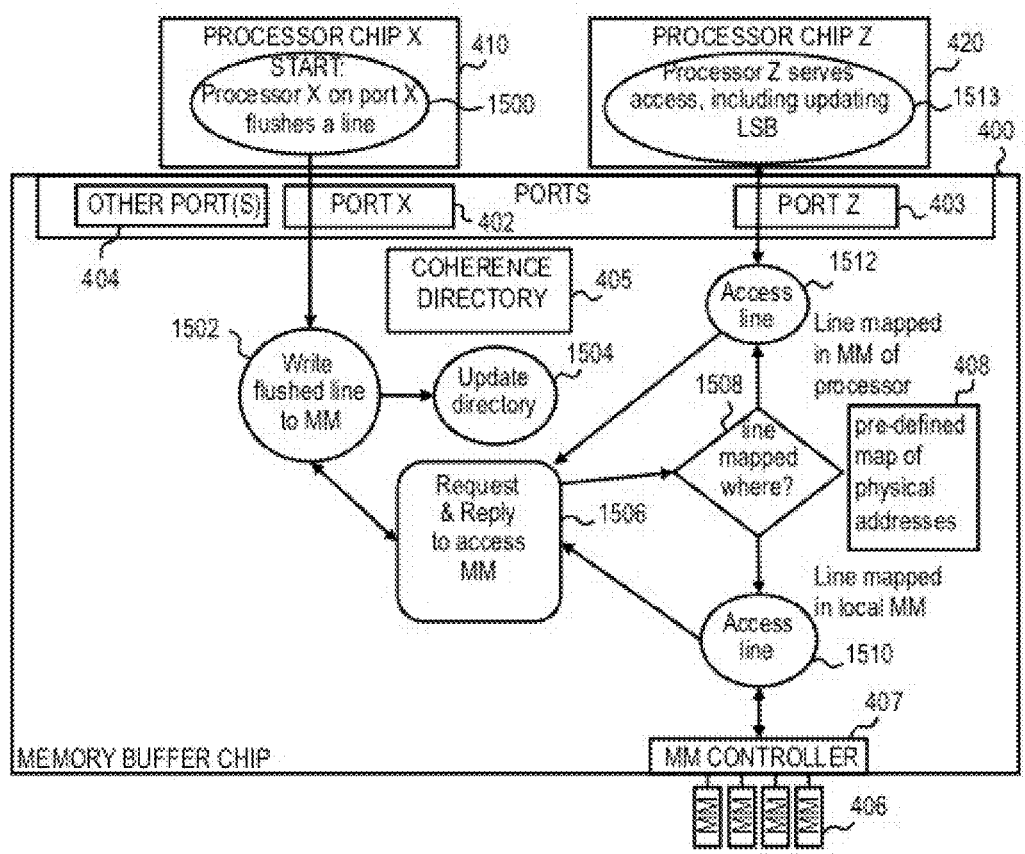
FIG. 5 depicts a schematic flow diagram of a second exemplary method for operating a memory buffer chip of FIG. 2.

FIG. 5 shows a schematic diagram illustrating a process of flushing an exclusive write copy of a memory line cached by processor chip X 410 for example due to the fact that the cache space occupied by the exclusive write copy may be needed for other purposes. In block 1500, processor chip X 410 communicatively coupled to the memory buffer chip 400 via the port X 402 may initiate a flushing of a copy of a memory line stored in a memory module local to processor chip Z 420. In block 1502, a writing of the flushed line to the memory module local to the processor chip Z 420 is initiated. In block 1504, the coherence directory 405 of the memory buffer chip 400 responsible for implementing coherency of the memory line is updated accordingly. In block 1506, a request for accessing the storage location of the memory line is provided. In block 1508, it is determined where the memory line is mapped using a predefined map of physical addresses 408. In case it is determined that the memory line is stored in a memory module 406 local to the memory buffer chip 400, the respective memory module 406 is accessed via the DRAM controller 407 and the current data value of the memory line is written to the memory module 406. In case it is determined in block 1508 that the memory line is mapped in a memory module local to a processor chip, i.e. processor chip Z 420, the processor chip is accessed in block 1512 via the port Z 403 of the memory buffer chip 400 and the current value of the memory line is written to the memory module of processor chip Z 420. For this purpose, the processor chip Z 420 serves the access including updating the line state bit in block 1513. After having stored current value of the memory line in block 1506 a confirmation may be generated as a reply to the access request.

Figure 6:
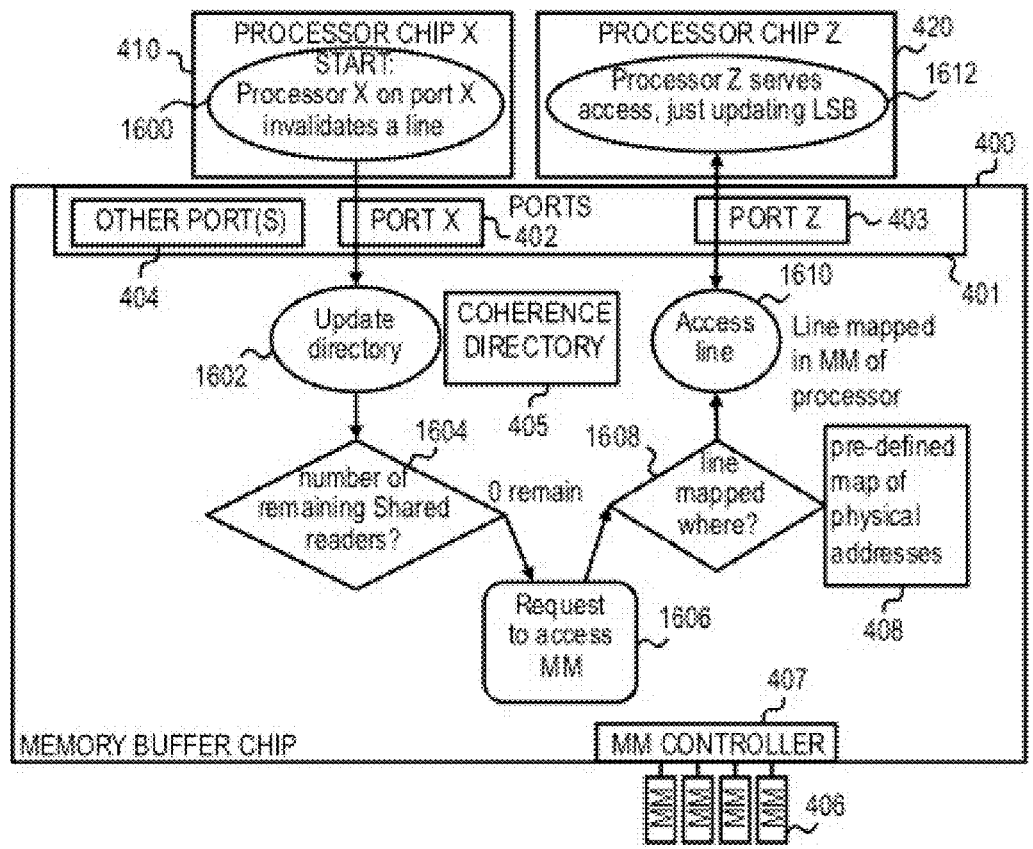
FIG. 6 depicts a schematic diagram illustrating a third exemplary method for operating a memory buffer chip of FIG. 2.

FIG. 6 illustrates a method for invalidating a copy of a memory line cached in processor chip X 410. The copy may for example be a shared read copy. In block 1600, processor chip X 410 initiates an invalidation of the shared read copy of the memory line. The memory line may for example be stored in a memory module local to processor chip Z 420. For this purpose, an invalidation command is provided to the memory buffer chip 400 via port X 402. In block 1602, the coherence directory 405 is updated accordingly. In block 1604, the number of remaining shared read copies is determined using the coherence directory 405. In case the remaining number is larger than 0 the method may end. In case the remaining number is 0, the method continues in block 1606 requesting to access the memory module local to the processor chip Z 420. In block 1608, it is determined in which memory module the memory line is stored using a predefined map of physical addresses. In case it is determined that the memory line is stored in a memory module local to processor chip Z 420, processor chip Z 420 is accessed in block 1610 via port Z 403. The processor chip Z 420 serves the access in block 1612 by just updating the LSB, i.e. setting the LSB to '0' indicating that no copies of the memory line are currently cached by any processor chip or to '00' in case of two LSBs.

Figure 7:
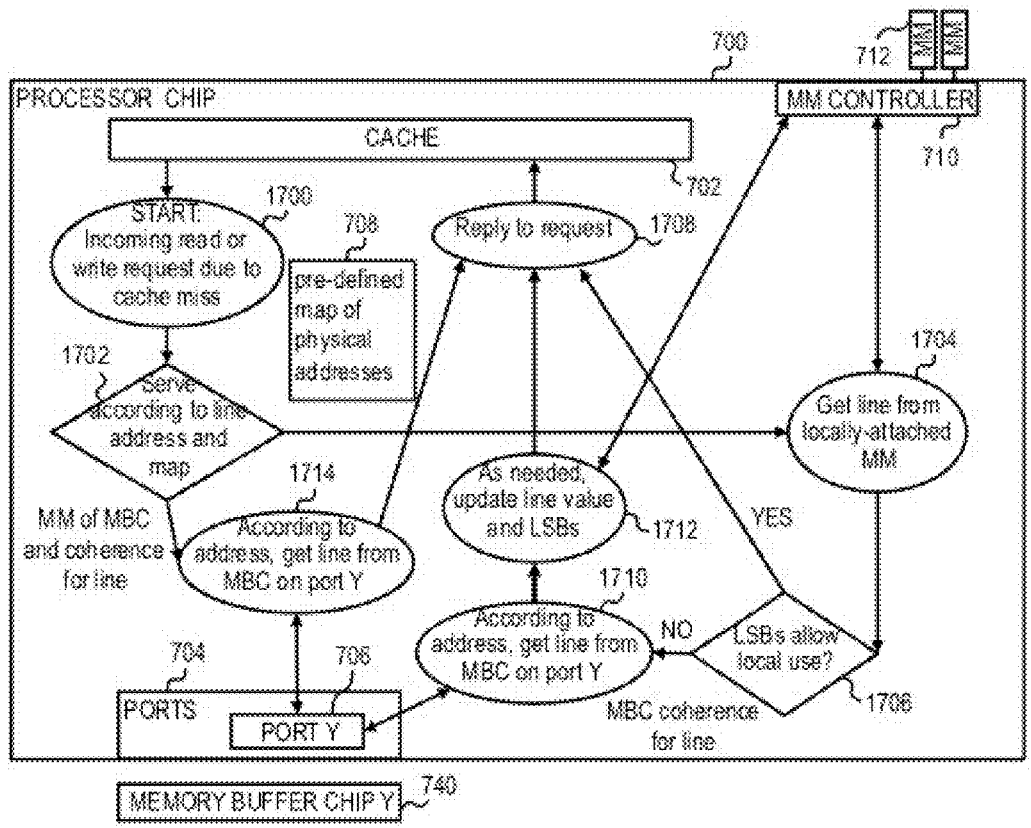
FIG. 7 depicts a schematic flow diagram of a fourth exemplary method for operating a processor chip of FIG. 2.

FIG. 7 shows a schematic diagram illustrating an exemplary method performed by a processor chip 700. The processor chip 700 may comprise a cache 702, ports 704 comprising a port Y 706 establishing a point-to-point connection to a memory buffer chip 740. The processor chip 700 may further comprise a predefined map of physical addresses 708 and a memory controller 710 for controlling memory modules 712 local to the processor chip 700. In block 1700, a read or write request due to a cache miss is provided. A cache miss may for example be given in case the cache does not comprise a memory line to be read or written, i.e. it may initially be determined whether a requested memory line is cached in cache 702. Furthermore, a cache miss may also be given in case the cache 702 comprises a wrong version of a requested memory line, for example a shared read copy of the memory line, when an exclusive write copy is requested. In block 1702, it is determined where the memory line is mapped using the predefined map of physical addresses 708. In case the requested memory line is stored in a memory module 712 local to the processor chip 700 the respective line is retrieved from the memory module 712 via the memory controller 710 in block 1704. Further, in block 1706 it is determined whether the line state bit allows the local use of the copy of the memory line by the processor chip 700. In case the line bit state indicates that the use is allowed, the retrieved copy of the memory line is provided as a reply to the request to the cache 702 in block 1708. In case it is determined in block 1706 that the line state bit does not allow the local use of the copy of the memory line, the method continues in block 1710. In block 1710, a copy of the memory line which is allowed for local use by the processor chip 700 is retrieved from a processor chip currently caching the allowed copy via the appropriate memory buffer chip Y 740 via the port Y 706. A copy of the memory line may for example always be allowed for local use in case the LSB indicates that no other copies of the memory line are used by any other processor chips. Further, a shared read copy may be allowed for local use as long as other processor chips are currently only caching shared read copies. A copy may never be allowed for local use in case the LSB indicates that another processor chip is currently caching a write exclusive copy. In that case the exclusive copy has to be retrieved as the allowable copy.

The method may continue with block 1712, in which the LSB of the memory line stored in the memory module 712 is updated as needed via memory controller 710. In block 1708, the copy of the memory line retrieved via the memory buffer chip Y 740 is provided to the cache 702 as a reply to the request. In case in block 1702 it is determined that the requested memory line is not stored in a memory module 712 local to the processor chip 710, but rather stored in a memory module local to a memory buffer chip, e.g. memory buffer chip Y 740, or stored in a memory module local to another processor chip, the respective memory line is requested from the appropriate memory buffer chip, e.g. via port Y 706 according to the determined address. The method may continue in block 1708, where the memory line retrieved from the memory module local to memory buffer chip Y 740 is provided as a reply to the request in block 1708.

In an alternative embodiment of FIG. 7 dirty bits may be used. In this case block 1712 may be removed. The memory line's new data value and new LSB value may be stored in block 1708 in cache 702. By adding a dirty bit to the memory line it may be identified if the memory line data value or LSB value has not been stored to the memory module 712 due to the removal of block 1712. Eventually, when the memory line is flushed or invalidated from the cache 702 an additional block may be added of using the dirty bit to identify if the memory line data value or LSB value should be stored to the memory module 712. In other words, the determination according to block 1712 is performed based on the value of a dirty bit and only upon a flushing or invalidation of a copy of the memory line cached in cache 702. This may have the beneficial effect that application performance may be improved by reducing the number of write operations performed on the memory module 712.

Figure 8:
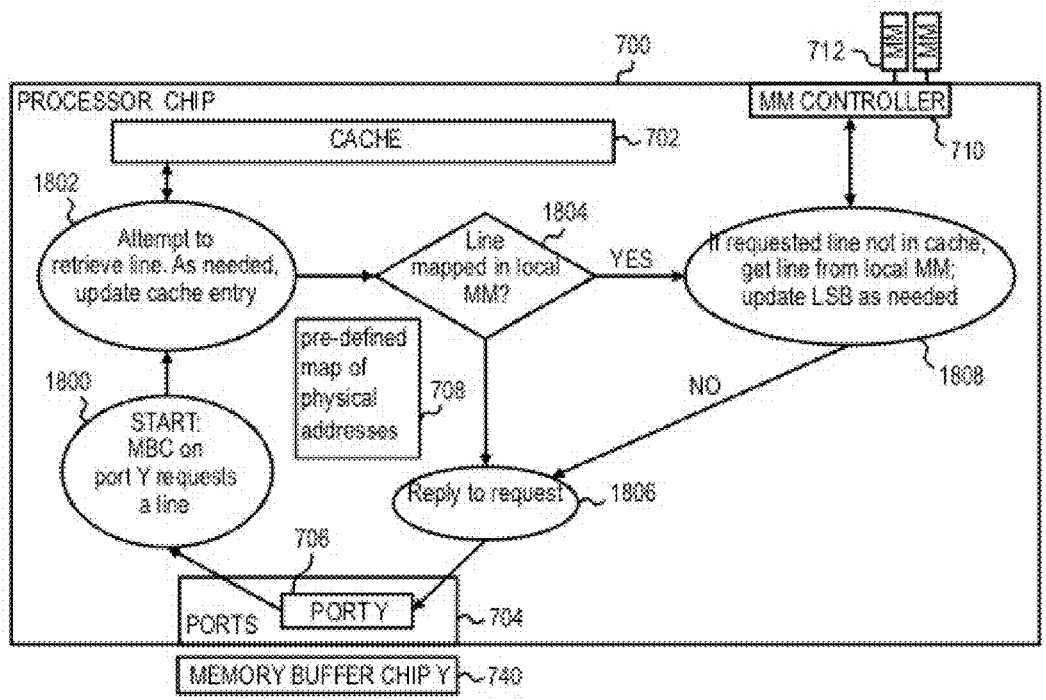
FIG. 8 depicts a schematic flow diagram of a fifth exemplary method for operating a processor chip of FIG. 2.

FIG. 8 shows a schematic flow diagram for a method performed by the processor chip 700. According to the predefined map of physical addresses 708, the processor chip 700 may provide a memory line stored in memory modules 712 and serve it to another processor chip via memory buffer chip Y 740. In block 1800, the processor chip 700 may receive a request for a memory line from memory buffer chip Y 740 via port Y 706. In block 1802, processor chip 700 may attempt to retrieve the requested memory line from the cache 702 and update the cache entry as needed. In block 1804, it is determined whether the memory line is mapped in a memory module 712 local to the processor chip 700 using a predefined map of physical addresses 708. In case the requested memory line was in the cache 702 and is not mapped in a local memory module the method continues in block 1806 by providing the requested memory line in reply to the request to the memory buffer chip Y 740 via port Y 706. In case it is determined in block 1804 that the requested memory line is locally mapped in a memory module 712, the method continues in block 1808. In block 1808, the value of the requested memory line is retrieved from the memory module 712 in case the line was not in the cache. Furthermore, the LSB may be updated as needed. In case the memory line was in the cache, the memory module 712 may be updated with the current value of the memory line. The method may continue in block 1806 by providing the retrieved memory line as a reply to the request to the memory buffer chip Y 740.

Figure 9:
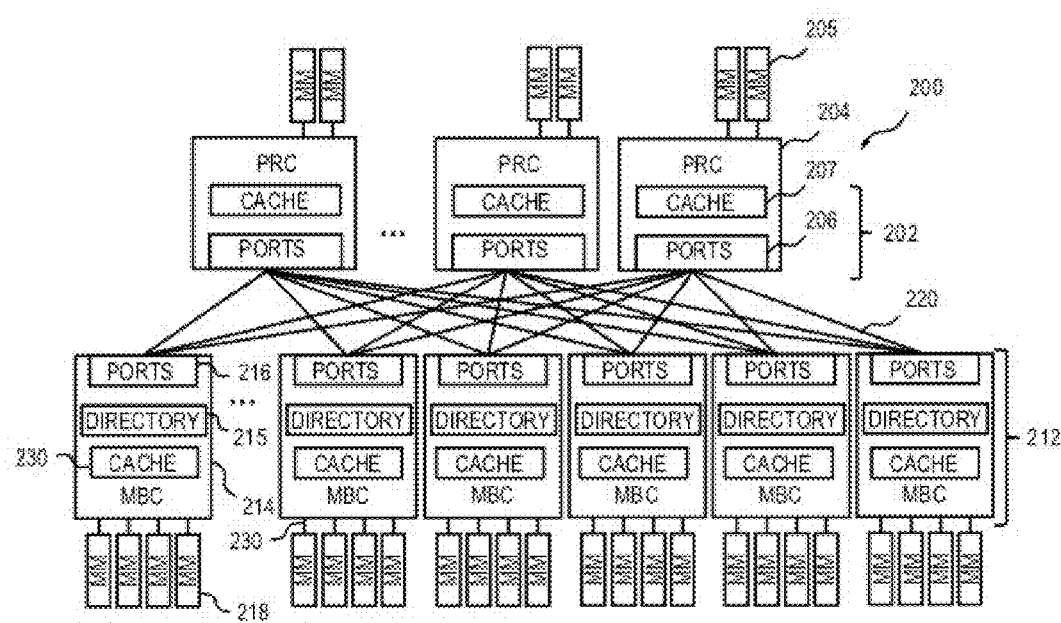
FIG. 9 depicts a schematic diagram illustrating a second example.

FIG. 9 shows a second example. The computer system 200 of FIG. 9 differs from the computer system 200 of FIG. 2 in that each of the memory buffer chips 214 comprises a cache 230. The cache 230 may be used for caching memory lines stored in the memory modules 218 local to the memory buffer chips 214. This may have the beneficial effect of enabling a faster and more energy efficient read or write access to the memory lines in the cache compared with a read or write access to the memory modules 218. Furthermore, the cache may be used for caching memory lines which are stored in the memory modules 205 local to the processor chip 204 for which the respective memory buffer chip 214 implements coherency. This may have the beneficial effect that it allows for a much faster more efficient access to the cached memory line in the cache 230 compared with an access to the memory line in a memory module 205 via a processor chip 204 to which the memory module is local and a point-to-point communication connection between the respective memory buffer chip 214 and the respective processor chip 204.

Figure 10:
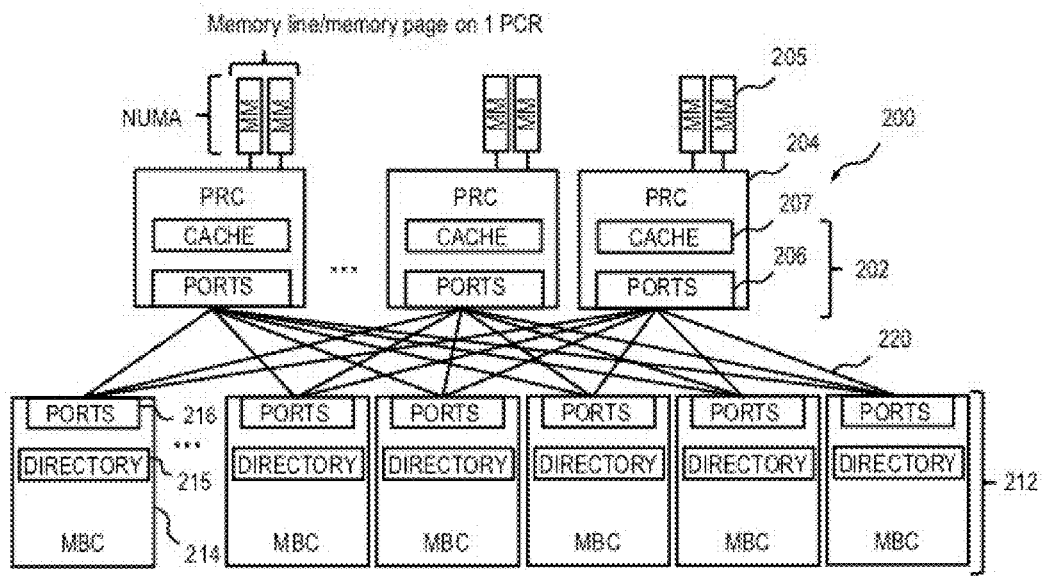
FIG. 10 depicts a schematic diagram illustrating a third example.

FIG. 10 shows a third exemplary schematic diagram illustrating a third example. The computer system 200 of FIG. 10 corresponds to the computer system 200 of FIG. 9 and differs in that no memory modules are local to the memory buffer chips 214. Thus, the memory buffer chips 214 are provided in form of mere cache buffering chips with no local memory modules. For some applications a computer system with no local memory modules communicatively coupled to the memory buffer chips 214 may be preferable. Consequently, the cache 230 may only cache memory lines stored in memory modules 205 local to processor chips 204.

Figure 11:
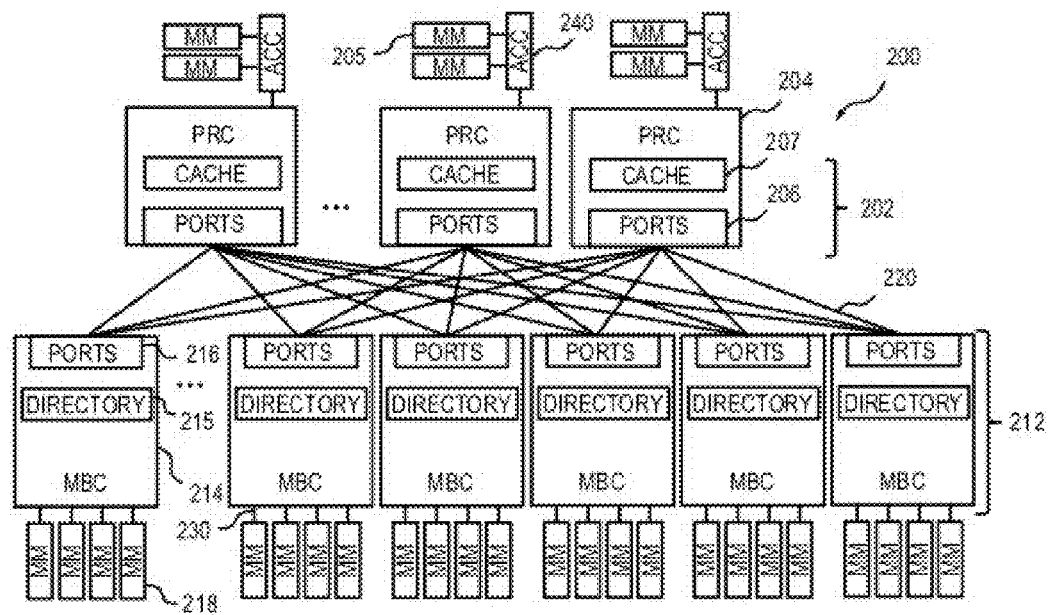
FIG. 11 depicts a schematic diagram illustrating a fourth example.

FIG. 11 shows a fourth example. The computer system 200 of FIG. 11 corresponds to the computer system 200 of FIG. 2 and differs only in that the memory modules 205 local to the processor chips 204 are communicatively coupled to the same via accelerator chips 240. An accelerator chip (ACC) may allow for a faster access to memory lines stored in the memory modules 205. According to embodiments, the accelerator chip 240 may use line state bits on the memory modules 205 local to the accelerator chip 240. According to embodiments, a processor chip 204 may be provided with zero, one, two or more accelerator chips 240. An accelerator chip 240 may for example be provided in form of a GPU, FPGA or ASIC. For the set of processor chips 202 in the system 200, each processor chip 204 may have the same or a different number and the same or a different form of accelerator chips 240.

Figure 12:
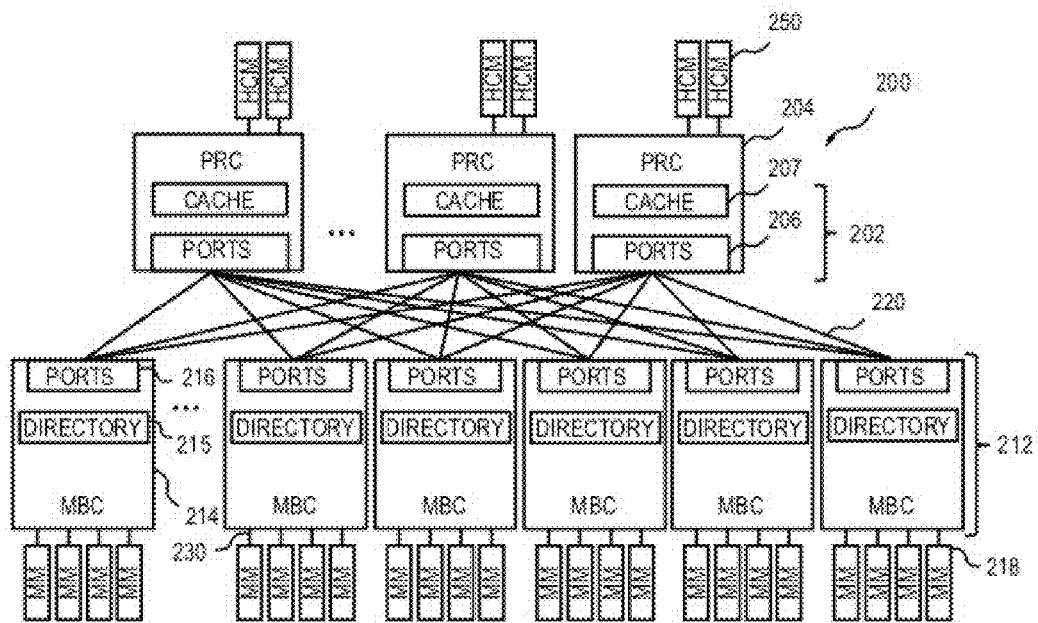
FIG. 12 depicts a schematic diagram illustrating a fifth example.

FIG. 12 shows a schematic diagram of a fifth example. The computer system 200 of FIG. 12 differs from the computer system 200 of FIG. 2 in that the memory modules local to the processor chips 204 are provided in form of an integrated on package memory. A respective integrated on package memory may e.g. be provided based on hybrid memory cube (HMC) or high bandwidth memory (HBM).

Figure 13:
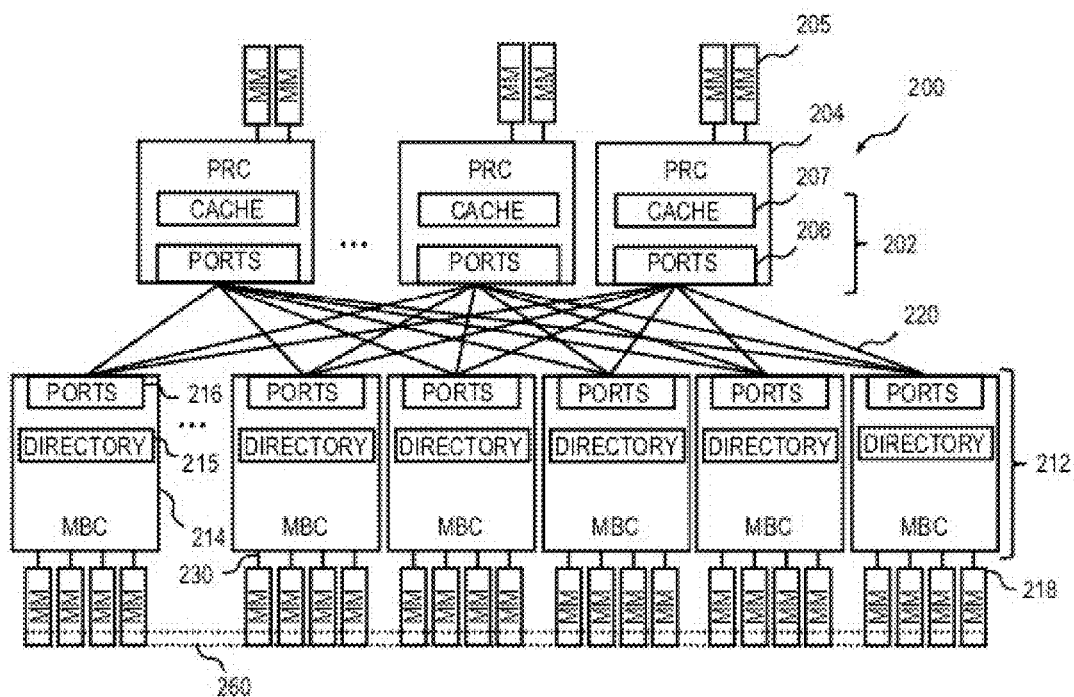
FIG. 13 depicts a schematic diagram illustrating a sixth example.

FIG. 13 shows a sixth example. The computer system 200 of FIG. 13 corresponds to the computer system 200 of FIG. 2 and the aggregate memory storage capacity in the memory modules 218 local to the memory buffer chips 214 is assumed to be larger than the aggregate memory storage capacity in the memory modules 205 local to the processor chips 212. In case of the computer system 200 shown in FIG. 13, an area 260 is dedicated in each of the memory modules 218 local to the memory buffer chips 214 for caching copies of the entire memory module 205 attached to the processor chip 204 for which the respective memory buffer chip is responsible to implement coherency. Thus, no directory is needed for finding the copy 260 cached in the memory module 218 local to the memory buffer chip 214. The mapping of the memory lines across the memory buffer chips 214 corresponds to the distribution of the coherence directories. Thus, each address in the memory modules 205 attached to a processor chip 204 has a copy 260 at a fixed address in a memory module 218 local to a memory buffer chip 214. Assuming this caching is only done for a memory line in the coherence directory, then each directory entry includes information indicating whether the memory module 218 local to the memory buffer chip 214 comprises a valid copy of the respective memory line. In the computer system 200 according to FIG. 13 remote access to memory modules 205 local to processor chips 204 may be minimized and thus the access times required for accessing memory lines of the memory modules 205 are reduced.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the disclosure may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system with a set of processor chips comprising a plurality of processor chips and a set of memory buffer chips comprising a plurality of memory buffer chips, each of the processor chips being communicatively coupled to at least one memory module configured for storing memory lines and assigned to the processor chip, each of the processor chips comprising a cache configured for caching memory lines, each of the processor chips being communicatively coupled to each of the memory buffer chips via a memory-buffer-chip-specific bidirectional point-to-point communication connection, at least one of the memory buffer chips comprising a coherence directory and being configured for being exclusively in charge for implementing directory-based coherence over the caches of the processor chips for at least one pre-defined address-based subset of memory lines stored in at least one of the memory modules assigned to one of the processor chips, the processor chip assigned to the at least one memory module being configured for transferring memory lines of the subset of memory lines between the at least one memory module and the caches of each of the remaining processor chips of the set of processor chips using the memory buffer chip in charge for implementing the coherence for the subset of memory lines as a transfer node and the assigned memory buffer chip being configured for updating its coherence directory regarding the transfer of the memory lines.

2. The computer system of claim 1, each of the processor chips being communicatively coupled to a plurality of the memory modules.

3. The computer system of claim 2, the system comprising a plurality of address-based subsets of memory lines, memory lines of the same subset being stored in memory modules assigned to the same processor chip, for each of the subsets directory-based coherence being implemented by each of the memory buffer chips comprising a coherence directory and being configured for being exclusively in charge for implementing the directory-based coherence over the caches of the processor chips for at least one subset of the plurality of subsets of memory lines.

4. The computer system of claim 2, the memory modules assigned to the processor chips being locally attached to the assigned processor chip in form of an integrated on-package memory.

5. The computer system of claim 1, at least one of the processor chips being communicatively coupled to the at least one memory module assigned to the processor chip via an accelerator chip.

6. The computer system of claim 1, the bidirectional point-to-point communication connections being serial communication connections.

7. The computer system of claim 1, the processor chip assigned to the at least one memory module further being configured for transferring the memory lines of the subset of memory lines directly between the at least one memory module and the cache of the assigned processor chip without using any of the memory buffer chips as a transfer node.

8. The computer system of claim 7, each of the memory lines stored in the at least one of the memory modules assigned to one of the processor chips comprising a line state bit indicating whether the memory line is cached by any other processor chip than the assigned processor chip, the system being configured such that, if the line state bit indicates that the memory line is not cached by any other processor chip than the assigned processor chip, the assigned processor chip transfers the memory line between the at least one memory module and the cache of the assigned processor chip without examining or updating the coherence directory of the memory buffer chip implementing the coherence for the memory line.

9. The computer system of claim 8, each memory line comprising two line state bits configured for indicating whether a shared read version, an exclusive write version or no version of the memory line being cached by any other processor chip than the assigned processor chip.

10. The computer system of claim 9, the system being configured such that, if the two line state bits indicate that an exclusive write version of the memory line is cached by a processor chip other than the assigned processor chip, the assigned processor chip transfers the memory line from the cache of the processor chip caching the memory line to the cache of the assigned processor chip using the memory buffer chip in charge for implementing the coherence for the memory line as a transfer node, the coherence directory of the memory buffer chip being examined by the memory buffer chip to identify the processor chip other than the assigned processor chip and updated regarding the transfer of the exclusive write version of the memory line.

11. The computer system of claim 1, each memory line being cached by any of the processor chips further being provided with a dirty bit indicating if the respective copy of the memory line has been modified without having stored the modification by updating the memory line in the memory module.

12. The computer system of claim 3, each memory buffer chip comprising a cache for caching memory lines comprised by the pre-defined subset of memory lines for which the memory buffer chip exclusively implements coherence.

13. The computer system of claim 12, at least one of the memory buffer chips being a cache buffer chip without memory modules communicatively coupled and assigned to the cache buffer chip.

14. The computer system of claim 3, each of the memory buffer chips being communicatively coupled to at least one memory module configured for storing memory lines and assigned to the memory buffer chip, each of the memory buffer chips further being configured for implementing the directory-based coherence for the memory lines stored in the at least one memory module assigned to the memory buffer chip.

15. The computer system of claim 14, each of the memory buffer chips being communicatively coupled to a plurality of memory modules configured for storing memory lines and assigned to the respective memory buffer chip, each of the memory buffer chips further being configured for implementing the directory-based coherence for the memory lines stored in all the memory modules assigned to the memory buffer chip.

16. The computer system of claim 14, each memory buffer chip comprising a cache for caching one or more of the memory lines stored in the at least one memory module assigned to the memory buffer chip.

17. The computer system of claim 14, the memory modules assigned to the memory buffer chip implementing the directory-based coherence for at least one of the subsets of memory lines being configured for caching one or more memory lines of the at least one subset, the coherence directory of the memory buffer chip indicating for each of the memory lines of the subset if the memory line is cached in the memory modules assigned to the memory buffer chip.

18. The computer system of claim 3, each processor chip comprising a number of P ports, each memory buffer chip comprising a number of H=P/X ports with P, H, and X being positive integers, each port being configured for establishing a single one of the bidirectional point-to- point communication connections, the set of processor chips comprising H/Y processor chips, the set of memory buffer chips comprising PN memory buffer chips with Y being a positive integer selected from the interval of 1 to X to construct a pre-selected size of computer system, each processor chip being communicatively coupled to each memory buffer chip by Y bidirectional point-to-point communication connections, each bidirectional point-to-point communication connection being established via a pair of ports comprising one of the P ports of the processor chip and one of the H ports of the memory buffer chip, each pair of ports being exclusively assigned to the respective bidirectional point-to-point communication connection.

19. The computer system of claim 18, for transferring any given one of the memory lines via the memory buffer chip which implements the directory-based coherence for the respective memory line, each processor chip uses a pre-defined one of its P ports communicatively coupled via one of the bidirectional point-to-point communication connections to a pre-defined one of the H ports of the memory buffer chip implementing the directory-based coherence for the respective memory line, the pre-defined ports being assigned to the address of the memory line, the coherence directory of the respective memory buffer chip treating each one of the H ports of the memory buffer chip as an independent participant taking part in the transfer of the memory line, when indicating active participants by which the memory line is cached, the coherence directory indicates for the memory line at most HN active participants.

20. A method for transferring data in a computer system with a set of processor chips comprising a plurality of processor chips and a set of memory buffer chips comprising a plurality of memory buffer chips, each of the processor chips being communicatively coupled to at least one memory module configured for storing memory lines and assigned to the processor chip, each of the processor chips comprising a cache configured for caching memory lines, each of the processor chips being communicatively coupled to each of the memory buffer chips via a memory-buffer-chip-specific bidirectional point-to-point communication connection, at least one of the memory buffer chips comprising a coherence directory and being configured for being exclusively in charge for implementing directory-based coherence over the caches of the processor chips for at least one pre-defined address-based subset of memory lines stored in at least one of the memory modules assigned to one of the processor chips, the method comprising:

transferring by the processor chip assigned to the at least one memory module a memory line of the subset of memory lines between the at least one memory module and the cache of one of the remaining processor chips of the set of processor chips using the memory buffer chip in charge for implementing the coherence for the subset of memory lines as a transfer node and updating by the memory buffer chip the coherence directory regarding the transfer of the memory lines.

\* \* \* \* \*